United States Patent
Shetty et al.

(10) Patent No.: US 8,934,499 B1
(45) Date of Patent: Jan. 13, 2015

(54) DYNAMICALLY TRANSFERRING BETWEEN MULTIPLE-INPUT AND MULTIPLE-OUTPUT (MIMO) TRANSMIT MODES BASED ON A USAGE LEVEL OF A WIRELESS ACCESS NODE

(75) Inventors: Manoj Shetty, Overland Park, KS (US); Sachin R. Vargantwar, Overland Park, KS (US); Siddharth S. Oroskar, Overland Park, KS (US); Maulik K. Shah, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 505 days.

(21) Appl. No.: 13/035,778

(22) Filed: Feb. 25, 2011

(51) Int. Cl.
*H04J 3/16* (2006.01)
*H04L 12/66* (2006.01)

(52) U.S. Cl.
USPC .......................................... 370/437; 370/463

(58) Field of Classification Search
None
See application file for complete search history.

(56) References Cited

U.S. PATENT DOCUMENTS

| | | | |
|---|---|---|---|
| 7,020,482 B2 | 3/2006 | Medvedev et al. | |
| 7,076,263 B2 | 7/2006 | Medvedev et al. | |
| 7,221,956 B2 | 5/2007 | Medvedev et al. | |
| 7,239,886 B2 | 7/2007 | Gross et al. | |
| 2002/0067701 A1 | 6/2002 | Chen et al. | |
| 2003/0139196 A1 | 7/2003 | Medvedev et al. | |
| 2003/0157954 A1 | 8/2003 | Medvedev et al. | |
| 2004/0032910 A1 | 2/2004 | Horng et al. | |
| 2005/0130694 A1 | 6/2005 | Medvedev et al. | |
| 2006/0116155 A1 | 6/2006 | Medvedev et al. | |
| 2006/0262874 A1 | 11/2006 | Shan | |
| 2008/0094281 A1* | 4/2008 | Teng et al. | 342/368 |
| 2010/0056170 A1 | 3/2010 | Lindoff et al. | |
| 2011/0105064 A1* | 5/2011 | Kusano et al. | 455/129 |
| 2011/0149942 A1* | 6/2011 | Ko et al. | 370/343 |
| 2011/0271309 A1* | 11/2011 | Chetlur et al. | 725/91 |
| 2012/0170507 A1* | 7/2012 | Sawai | 370/315 |

* cited by examiner

*Primary Examiner* — Christine Duong (57) ABSTRACT

Embodiments disclosed herein provide systems and methods for dynamically transferring between multiple-input and multiple-output (MIMO) transmit modes based on a usage level of a wireless access node. In a particular embodiment, a method provides transferring wireless communications to a wireless communication device via a plurality of ports in a wireless access node on a wireless communication network. The method further provides determining an access node usage level for the wireless access node. If the access node usage level satisfies a condition for access node usage, the method provides configuring the plurality of ports to use a MIMO 2 transmit-2 carrier mode for transmitting the wireless communications. If the access node usage level does not satisfy the condition for access node usage, the method provides configuring the plurality of ports to use a MIMO 4 transmit-1 carrier mode for transmitting the wireless communications.

18 Claims, 7 Drawing Sheets

FIGURE 7

DYNAMICALLY TRANSFERRING BETWEEN MULTIPLE-INPUT AND MULTIPLE-OUTPUT (MIMO) TRANSMIT MODES BASED ON A USAGE LEVEL OF A WIRELESS ACCESS NODE

TECHNICAL BACKGROUND

Modern wireless communication protocols may use multiple-input and multiple-output (MIMO) transmission schemes when transferring communications to wireless devices. MIMO uses multiple antennas for each carrier in a wireless access node in order to improve communication transfer performance. The improvements in communication transfer performance may include increased data throughput and wireless range. Examples of MIMO wireless protocols include Worldwide Interoperability for Microwave Access (WIMAX), Long Term Evolution (LTE), and some forms of Wireless Fidelity (WIFI).

In some cases, a wireless access node may be able to vary the number of antennas and carriers used in the access node in order to either increase capacity or increase data throughput. For example, the access node may be able to use all of its antennas with a single carrier to maximize data throughput. Alternatively, the access node may be able to split the antennas among two carriers in order to increase capacity at the expense of data throughput. In this second arrangement, the access node is able to transmit communications to one set of wireless devices using one carrier while transmitting to another set using another carrier. Data throughput is sacrificed because less antennas are used for transmitting communications to each device.

OVERVIEW

Embodiments disclosed herein provide systems and methods for dynamically transferring between multiple-input and multiple-output (MIMO) transmit modes based on a usage level of a wireless access node. In a particular embodiment, a method provides transferring wireless communications to a wireless communication device via a plurality of ports in a wireless access node on a wireless communication network. The method further provides determining an access node usage level for the wireless access node. If the access node usage level satisfies a condition for access node usage, the method provides configuring the plurality of ports to use a MIMO 2 transmit-2 carrier mode for transmitting the wireless communications. If the access node usage level does not satisfy the condition for access node usage, the method provides configuring the plurality of ports to use a MIMO 4 transmit-1 carrier mode for transmitting the wireless communications.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
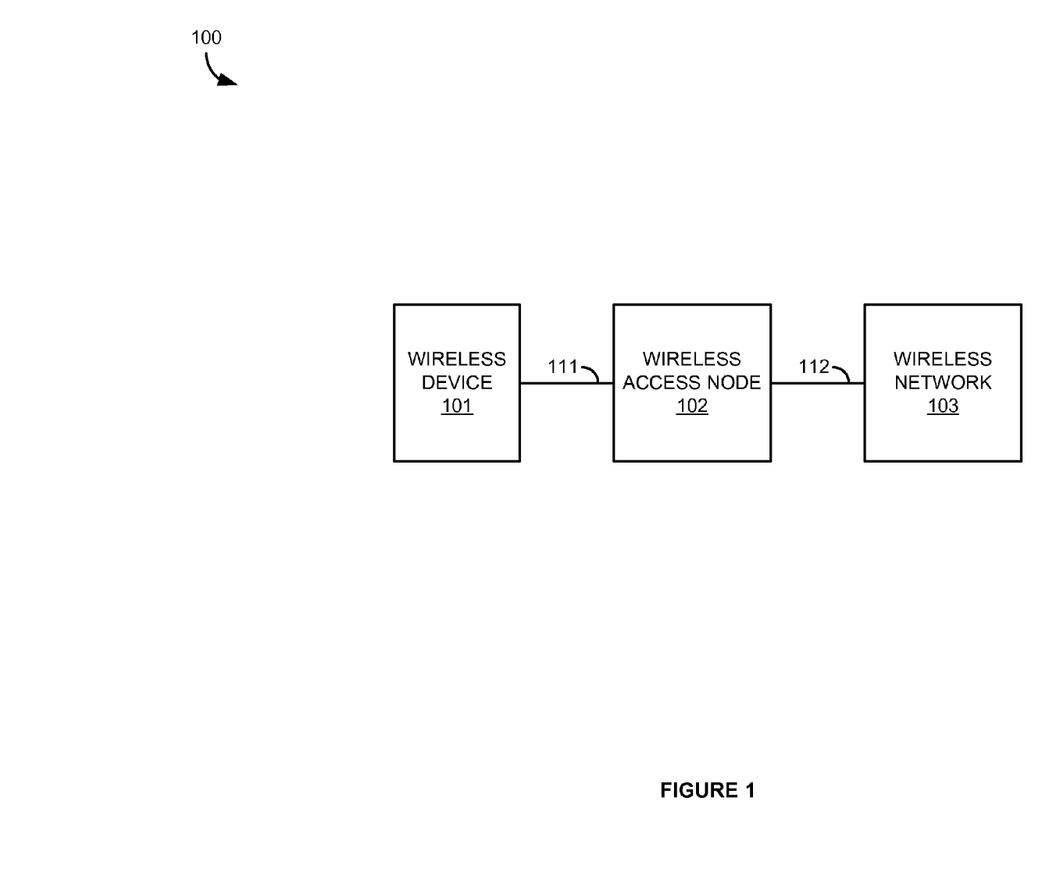
FIG. 1 illustrates a wireless communication system for dynamically transferring between MIMO transmit modes based on a usage level of a wireless access node.

FIG. 1 illustrates wireless communication system 100. Wireless communication system 100 includes wireless communication device 101, wireless access node 102, and wireless communication network 103. Wireless communication device 101 and wireless access node 102 communicate over wireless link 111. Wireless access node 102 and wireless communication network 103 communicate over communication link 112.

In operation, wireless communication system 100 uses a multiple-input and multiple-output (MIMO) communication transmission protocol. MIMO may also be used for receiving communications. The MIMO protocol employed by access node 102 uses one of two modes for transmitting communications to wireless devices, such as wireless device 101. Each mode uses the four ports included in access node 102, which are coupled to a MIMO antenna, for transmitting communications to connected wireless devices. A first mode (4T mode) uses all four ports and a single carrier to transmit communications to wireless devices. A second mode (2T mode) uses two carriers with each carrier assigned to two of the four ports to transmit communications to wireless devices.

4T mode allows for faster communication throughput to each wireless device because all four ports are being used to transmit communications. Alternatively, 2T mode allows for greater number of wireless devices to receive transmissions from access node 102. 2T mode is able to do this by transmitting communications to at least one wireless device on one carrier over two of the ports while the other two ports are using a second carrier to transmit communications to at least one other wireless device. Communication throughput to each device is slower in 2T mode because only two ports are used for transmitting to wireless devices rather than the 4 ports used in 4T mode.

Figure 2:
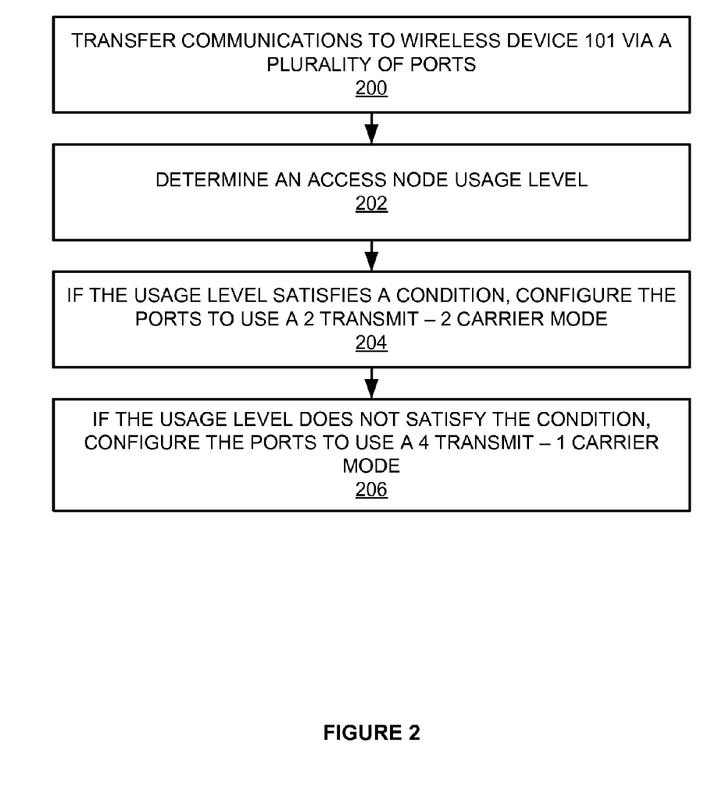
FIG. 2 illustrates the operation of the wireless communication system to dynamically transfer between MIMO transmit modes based on a usage level of a wireless access node.

FIG. 2 illustrates the operation of wireless communication system 100 to dynamically transfer between MIMO transmit modes based on a usage level of wireless access node 102. The operation begins with access node 102 transferring communications to wireless device 101 via a plurality of ports (step 200). The plurality of ports include at least four ports in order to operate in the 4T or 2T mode described above. Each of the ports is a coupling between an amplifier and an antenna in access node 102. The plurality of ports allows access node 102 to transfer communications using a MIMO wireless protocol. Examples of MIMO wireless protocols include Worldwide Interoperability for Microwave Access (WIMAX), Long Term Evolution (LTE), some forms of Wireless Fidelity (WIFI), or any other type of MIMO protocol. The communications transferred may be any type of communications, such as communications from wireless network 103 for a web browser, VoIP application, email application, media application, or any other communications destined for wireless device 101.

An access node usage level is determined for access node 102 (step 202). The access node usage level may be determined in access node 102, another system on wireless network 103, such as a mobile switching center, or some other access node usage determination system. The access node usage level may be the number of connected wireless devices to which access node 102 is currently transferring communications. The access node usage level may also be the amount of bandwidth being used to transfer communications to connected wireless devices or some combination of the number of connected wireless devices with the amount of bandwidth being used.

Alternatively, the access node usage level may be a predicted usage level for access node 102. For example, a schedule of events for the area service by access node 102 may indicate that an event will occur during a period of time that may lead to high usage of access node 102. Such an event may be a sporting event that usually brings a high number of people with wireless devices into the area serviced by access node 102.

If the access node usage level satisfies a condition for access node usage, then the plurality of ports is configured to use a 2T mode for transmitting wireless communications to wireless devices, including wireless device 101 (step 204). The condition may be a threshold access node usage level. If the threshold usage level is exceeded, then access node 102 uses a 2T mode for transmitting communications. The threshold usage level may be based on the usage level that access node 102 is able to handle before reaching a usage limit in 4T mode.

Likewise, if the access node usage level does not satisfy the condition for access node usage, then the plurality of ports is configured to use a 4T mode for transmitting wireless communications to wireless devices, including wireless device 101 (step 206). If the condition is a threshold usage level, then wireless access node will use 4T mode when the access node usage level is below the threshold.

The access node usage level may be determined periodically in order to switch between 4T mode and 2T mode depending on the current access node usage level. Consistent with steps 204 and 206, when access node 102 is operating in 4T mode and the access node usage level increases to be above the threshold usage value, access node 102 switches from 4T mode to 2T mode in order to allow for increased capacity for access node usage. Conversely, when access node 102 is operating in 2T mode and the access node usage level decrease to below the threshold usage value, access node 102 switches from 2T mode to 4T mode in order to allow more data throughput to wireless devices.

In some embodiments, access node 102 may transfer a message to wireless device 101 indicating that wireless access node has switched from one mode to the other. Alternatively, there may be mechanisms in place for wireless device 101 to automatically detect which mode access node 102 is using to transmit communications.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Wireless communication network 103 comprises network elements that provide wireless devices with wireless communication access to packet communication services. Wireless network 103 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various MIMO protocols, such as Worldwide Interoperability for Microwave Access (WIMAX), Long Term Evolution (LTE), Wireless Fidelity (WIFI), High Speed Packet Access (HSPA), or some other MIMO wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
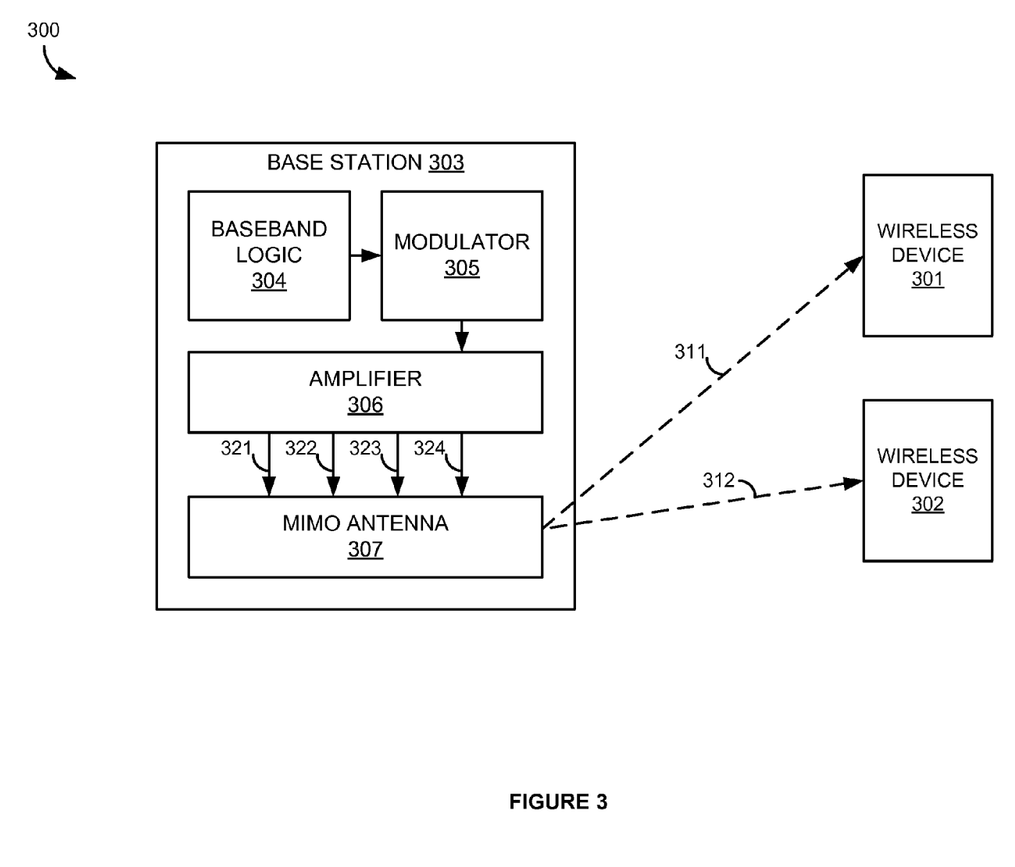
FIG. 3 illustrates a wireless communication system for dynamically transferring between MIMO transmit modes based on a usage level of a wireless access node.

FIG. 3 illustrates wireless communication system 300. Wireless communication system 300 includes wireless communication devices 101-102 and wireless base station 303. Base station 303 includes baseband logic 304, modulator 305, amplifier 306, and MIMO antenna 307. Amplifier 306 and MIMO antenna 307 are coupled together by ports 321-324. Wireless communication device 301 and base station 303 communicate over wireless link 311. Wireless communication device 302 and base station 303 communicate over wireless link 312.

Figure 4:
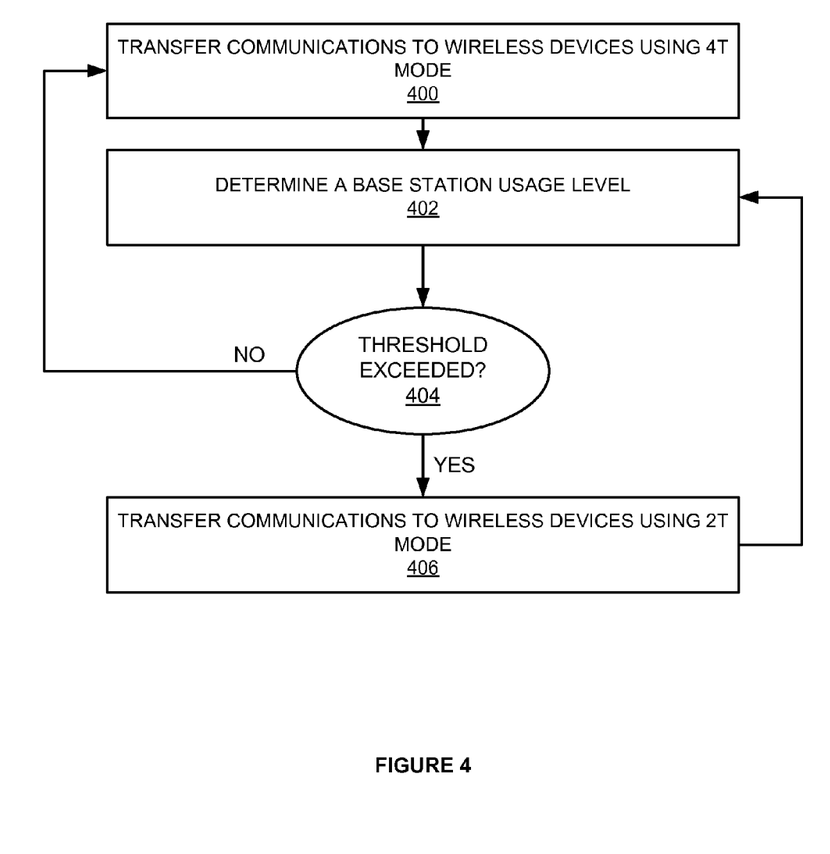
FIG. 4 illustrates the operation of the wireless communication system to dynamically transfer between MIMO transmit modes based on a usage level of a wireless access node.

FIG. 4 illustrates the operation of wireless communication system 100 to dynamically transfer between MIMO transmit modes based on a usage level of base station 303. The operation begins with base station 303 transferring communications to wireless devices 301 and 302 using a 4T transmit mode (step 500). The communications may be for any type of communications that either wireless device 301 or 302 may receive. The communications directed to wireless device 301 and 302 may be unique to each device or may be the same for both. In some embodiments, the operation may begin at step 406 with base station 303 transmitting in 2T mode.

Figure 5:
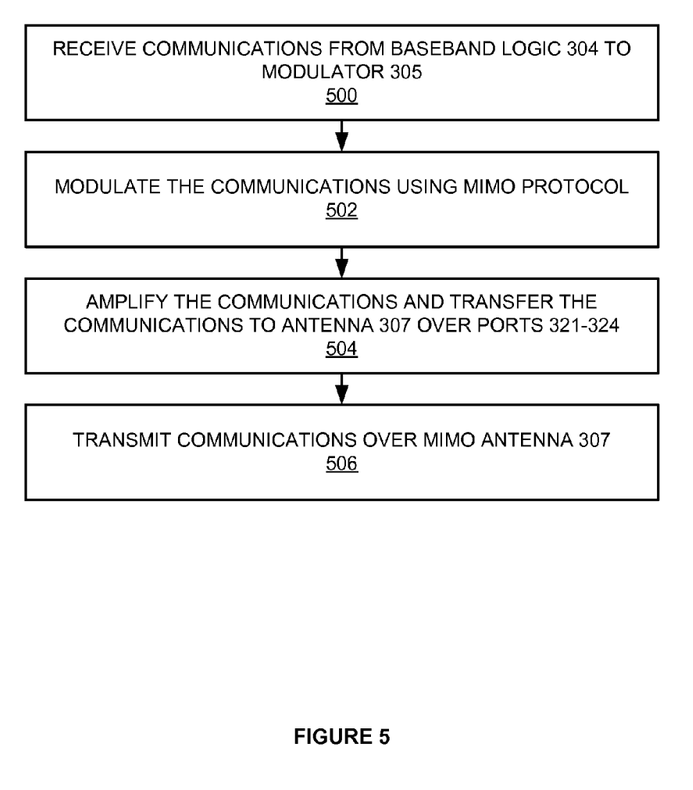
FIG. 5 illustrates the operation of a wireless base station to dynamically transfer between MIMO transmit modes based on a usage level of a wireless access node.

FIG. 5 illustrates how base station 303 transmits communications in 4T mode. After base station 303 receives communications directed to wireless devices 301 and 302, respectively, from a wireless communication network, modulator 305 receives the communications from baseband logic 304 (step 500). Modulator 305 modulates the communications for each device using a MIMO protocol for base station 303 (step 502). The MIMO protocol allows the both the communications directed to wireless device 301 and 302 to be transmitted using the same carrier over ports 321-324. Communications to other wireless devices may be modulated along with the communications for wireless devices 301 and 302 over the single carrier on ports 321-324. As the communications are modulated, the communications are transferred to amplifier 306.

Amplifier 306 then amplifies the modulated communications and transfers them to MIMO antenna 307 over ports 321-324 (step 504). MIMO Antenna 307 transfers the communications to wireless device 301 and 302, respectively, over wireless links 311 and 312 (step 506).

Referring back to FIG. 4, a usage level for base station 303 is determined (step 402). The usage level may be determined in base station 303, another system in the wireless network of which base station 303 is a component, such as a mobile switching center, or some other access node usage determination system. In this example, the usage level is determined as being a number of wireless devices receiving communications from base station 303. Hence, there may exist other unpictured wireless devices beyond just wireless device 301 and 302 receiving communications from base station 303.

In some cases, the usage level for base station 303 may be a predicted usage level. Predicting the usage level for a period of time allows base station 303 to switch the transmit mode from 4T mode to 2T mode in anticipation of needing the extra capacity allowed by 2T mode rather than waiting for the actual usage to increase. The prediction may be based on a schedule of events, a pattern of base station usage that is determined from past base station usage levels, or some other way of predicting a usage level for base station 303. For example a sporting event may be scheduled in the area covered by base station 303. Therefore, the usage level may be predicted to be high around the scheduled sporting event, thereby causing base station 303 to use 2T mode around the time of the event in anticipation of high usage.

After determining the usage level for base station 303, the usage level for base station 303 is compared against a threshold usage level value (step 404). As with determining the usage level, the comparison may be performed in base station 303, another system in the wireless network of which base station 303 is a component, such as a mobile switching center, or some other comparison system. If the determined usage level for base station 303 is less then the threshold, then base station 303 returns to step 400 to continue transferring communications using 4T mode. If the determined usage level for base station 303 is above the threshold, then the operation continues to step 406 and transfers communications to wireless devices 301 and 302 using a 2T mode.

Figure 6:
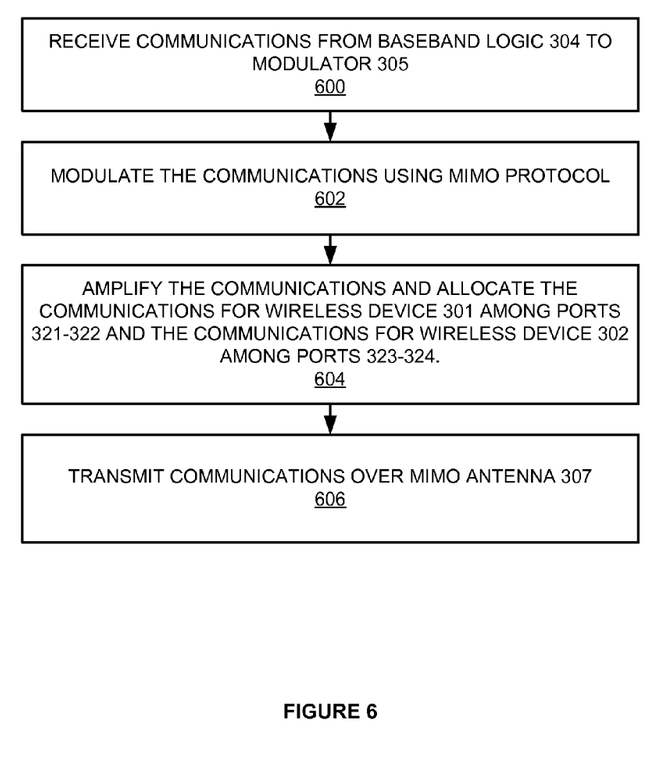
FIG. 6 illustrates the operation of a wireless base station to dynamically transfer between MIMO transmit modes based on a usage level of a wireless access node.

FIG. 6 illustrates how base station 303 transmits communications in 2T mode. After base station 303 receives communications directed to wireless devices 301 and 302, respectively, from a wireless communication network, modulator 305 receives the communications from baseband logic 304 (step 600). Modulator 305 modulates the communications for each device using a MIMO protocol for base station 303 (step 602). The MIMO protocol allows the both the communications directed to wireless device 301 and 302 to be transmitted using one of two carriers with one carrier transmitted over ports 321-322 and the other carrier over ports 323-324. Communications for other wireless devices may be modulated along with the communications for wireless devices 301 and 302 for transmission over ports 321-322 using one carrier or ports 323-324 using the other carrier. As the communications are modulated, the communications are transferred to amplifier 306.

Amplifier 306 then amplifies the modulated communications and transfers the communications for wireless device 301 to MIMO antenna 307 over ports 321-322 using one carrier and the communications for wireless device 302 to MIMO antenna 307 over ports 323-324 using another carrier (step 604). MIMO Antenna 307 transfers the communications to wireless device 301 and 302, respectively, over wireless links 311 and 312 (step 606).

Referring back to FIG. 4, after transferring the communications to wireless devices 301 and 302 using 2T mode, the process returns to step 402. Consequently, another base station usage level will be determined and then compared to the threshold value. After the comparison, base station 303 will either continue to transmit in 2T mode or, if the usage level falls below the threshold value, then base station 303 change to using 4T mode for transmissions to wireless devices 301 and 302.

Figure 7:
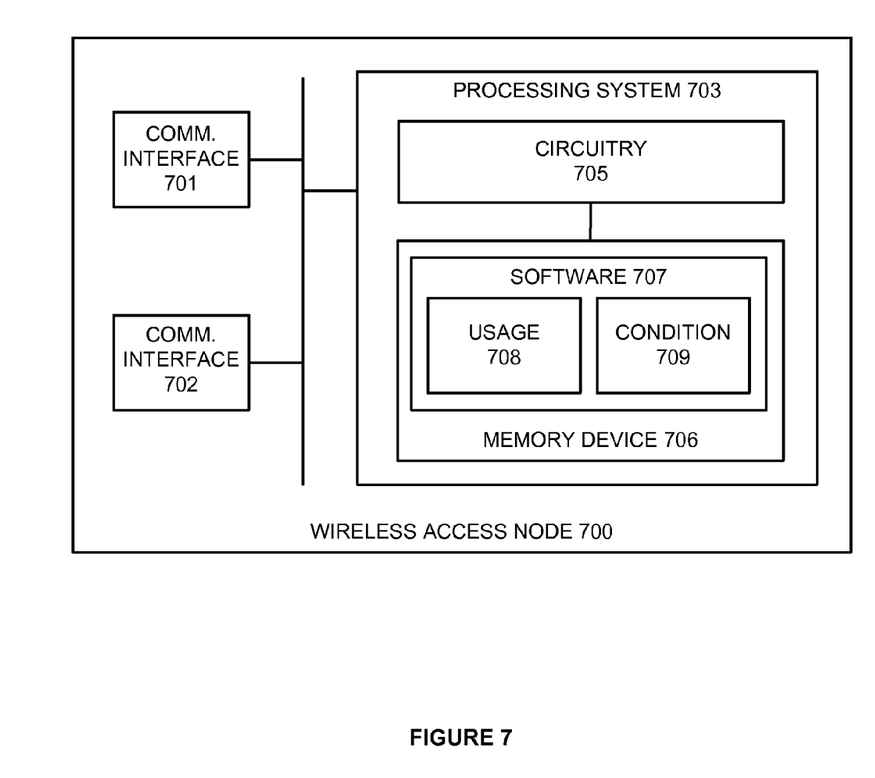
FIG. 7 illustrates a wireless access node for dynamically transferring between MIMO transmit modes based on a usage level of the wireless access node.

FIG. 7 illustrates wireless access node 700. Wireless communication device 700 is an example of wireless access node 102 and base station 304, although access node 102 and base station 304 could use alternative configurations. Wireless access node 700 comprises wireless communication interface 701, communication interface 702, and processing system 703. Processing system 703 is linked to wireless communication interface 701 and user interface 702. Processing system 703 includes processing circuitry 705 and memory device 706 that stores operating software 707.

Wireless communication interface 701 comprises RF communication circuitry and an antenna. The RF communication circuitry typically includes an amplifier, filter, RF modulator, and signal processing circuitry. Wireless communication interface 701 may also include a memory device, software, processing circuitry, or some other communication device. Wireless communication interface 701 may use various MIMO protocols, such as WIMAX, LTE, WIFI, HSPA, or some other wireless communication format. Wireless communication interface 701 is configured to transfer wireless communications to a wireless communication device via a plurality of ports.

Communication interface 702 comprises components that communicate over communication links, such as network cards, ports, RF transceivers, processing circuitry and software, or some other communication devices. Communication interface 702 may be configured to communicate over metallic, wireless, or optical links. Communication interface 702 may be configured to use TDM, IP, Ethernet, optical networking, wireless protocols, communication signaling, or some other communication format—including combinations thereof.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes access node usage module 708 and usage condition module 709. Operating software 707 may also include an operating system, utilities, drivers, network interfaces, applications, or some other type of software. When executed by processing circuitry 705, operating software 707 directs processing system 703 to operate wireless communication device 700 as described herein.

In particular, access node usage module 708 of operating software 707 directs processing system 703 to determine an access node usage level for wireless access node 700. Usage condition module 709 directs processing system 703 to, if the access node usage level satisfies a condition for access node usage, configure the plurality of ports in communication interface 701 to use a MIMO 2 transmit-2 carrier mode for transmitting the wireless communications. Usage condition module 709 directs processing system 703 to, if the access node usage level does not satisfy the condition for access node usage, configure the plurality of ports to use a MIMO 4 transmit-1 carrier mode for transmitting the wireless communications.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
    transferring wireless communications to a wireless communication device via a plurality of ports in a wireless access node on a wireless communication network;
    determining an access node usage level for the wireless access node;
    if the access node usage level is above a threshold access node usage level, configuring the plurality of ports to use a multiple-input and multiple-output (MIMO) 2 transmit-2 carrier mode for transmitting the wireless communications;
    if the access node usage level is not above the threshold access node usage level, configuring the plurality of ports to use a MIMO 4 transmit-1 carrier mode for transmitting the wireless communications.

2. The method of claim 1 wherein determining the access node usage level comprises determining a number of wireless communication devices that are exchanging communications with the wireless access node.

3. The method of claim 1 wherein determining the access node usage level comprises determining an amount of bandwidth used by wireless communication devices that are exchanging communications with the wireless access node.

4. The method of claim 1 wherein determining the access node usage level comprises determining a predicted usage of the wireless access node during a period of time.

5. The method of claim 4 wherein the predicted usage is based on a schedule of events indicating that at least one event will occur during the period of time near a service area covered by the wireless access node.

6. The method of claim 1 wherein the wireless communications use the Worldwide Interoperability for Microwave Access (WiMax) protocol.

7. The method of claim 1 wherein the wireless communications use the Long Term Evolution (LTE) protocol.

8. The method of claim 1 wherein each port is a coupling between an amplifier and an antenna in the wireless access node.

9. A wireless communication system comprising:
    a wireless access node on a wireless communication network configured to transfer wireless communications to a wireless communication device via a plurality of ports;
    an access node usage determination system configured to determine an access node usage level for the wireless access node;
    the access node further configured to, if the access node usage level is above a threshold access node usage level, configure the plurality of ports to use a multiple-input and multiple-output (MIMO) 2 transmit-2 carrier mode for transmitting the wireless communications and, if the access node usage level is not above the threshold access node usage level, configure the plurality of ports to use a MIMO 4 transmit-1 carrier mode for transmitting the wireless communications.

10. The wireless communication system of claim 9 wherein determining the access node usage level comprises determining a number of wireless communication devices that are exchanging communications with the wireless access node.

11. The wireless communication system of claim 9 wherein the access node usage determination system determines the access node usage level by determining an amount of bandwidth used by wireless communication devices that are exchanging communications with the wireless access node.

12. The wireless communication system of claim 9 wherein the access node usage determination system determines the access node usage level by determining a predicted usage of the wireless access node during a period of time.

13. The wireless communication system of claim 12 wherein the predicted usage is based on a schedule of events indicating that at least one event will occur during the period of time near a service area covered by the wireless access node.

14. The wireless communication system of claim 9 wherein the wireless communications use the Worldwide Interoperability for Microwave Access (WiMax) protocol.

15. The wireless communication system of claim 9 wherein the wireless communications use the Long Term Evolution (LTE) protocol.

16. The wireless communication system of claim 9 wherein each port is a coupling between an amplifier and an antenna in the wireless access node.

17. The wireless communication system of claim 9 wherein the functionality of the access node usage determination system is included in the wireless access node.

18. A wireless access node comprising:
    a wireless communication interface configured to transfer wireless communications to a wireless communication device via a plurality of ports;
    a processing system configured to determine an access node usage level for the wireless access node and, if the access node usage level is above a threshold access node usage level, configure the plurality of ports to use a multiple-input and multiple-output (MIMO) 2 transmit-2 carrier mode for transmitting the wireless communications and, if the access node usage level is not above the threshold access node usage level, configure the plurality of ports to use a MIMO 4 transmit-1 carrier mode for transmitting the wireless communications.

* * * * *